United States Patent [19]

McGee

[11] Patent Number: 5,421,385

[45] Date of Patent: Jun. 6, 1995

[54] METHOD AND APPARATUS FOR PROCESSING LOG FOR SAWMILL INCLUDING END DOGGING CARRIAGE WHICH ROTATIONALLY REPOSITIONS LOG TO CUTTING POSITION DETERMINED BY COMPUTER AFTER NON-ROTATIONAL SCANNING

[75] Inventor: Arthur L. McGee, Lake Oswego, Oreg.

[73] Assignee: The Coe Manufacturing Company, Painesville, Ohio

[21] Appl. No.: 144,764

[22] Filed: Oct. 29, 1993

[51] Int. Cl.[6] .......................... B27B 1/00; B27L 11/00
[52] U.S. Cl. .................................... 144/357; 83/367; 144/3 B; 144/162 R; 144/162 A; 144/242 R; 144/373; 364/474.09
[58] Field of Search .................. 83/360, 364, 365, 367, 83/371, 435, 435.1; 144/39, 3 R, 209 R, 209 A, 356, 357, 373, 242 R; 364/474.09

[56] References Cited

U.S. PATENT DOCUMENTS

| | | | |
|---|---|---|---|
| 4,152,960 | 5/1979 | Detjen | 83/435.1 |
| 4,378,827 | 4/1983 | Shawn et al. | 144/209 A |
| 4,383,560 | 5/1983 | McGee | 144/209 A |
| 4,398,580 | 8/1983 | Sohm et al. | 144/357 |
| 4,489,635 | 12/1984 | Cooper | 144/209 A |
| 4,803,371 | 2/1989 | Durland | 250/560 |
| 4,867,213 | 9/1989 | Bolton et al. | 144/357 |
| 4,947,909 | 8/1990 | Stroud | 144/357 |
| 4,996,900 | 3/1991 | Schmidt et al. | 83/435.1 |
| 5,135,037 | 8/1992 | Wijesinghe | 83/367 |
| 5,232,030 | 8/1993 | Knerr et al. | 144/39 |

Primary Examiner—W. Donald Bray
Attorney, Agent, or Firm—Klarquist Sparkman Campbell Leigh & Whinston

[57] ABSTRACT

A log processing method and apparatus are described in which the log is moved laterally through a light scanner by a pair of charger arms to determine the configuration of the log and the best cutting pattern solution for such log by a computer from the scan data. The log is skewed by adjusting the length and angular position of the charger arms to align the central axis of the log with the center of the cutting pattern solution. Then the log is swing by pivoting the charger arms into a transfer position where the log is transferred to an end dogging log carriage. After transfer, the log is rotationally repositioned into the desired cutting position by rotating it about a selected chuck of a plurality of chucks on one end dog with a driven dog blade on the other end dog which is aligned with the centerline of the cutting solution. After repositioning the log is clamped against further rotation by extending additional end dog chucks into engagement with the log. Then the clamped log is conveyed on the carriage through the cutting devices. One of the cutting devices is a bottom chipping head which is vertically adjusted in height by the computer during cutting to produce a curved or straight bottom surface on the log.

19 Claims, 9 Drawing Sheets

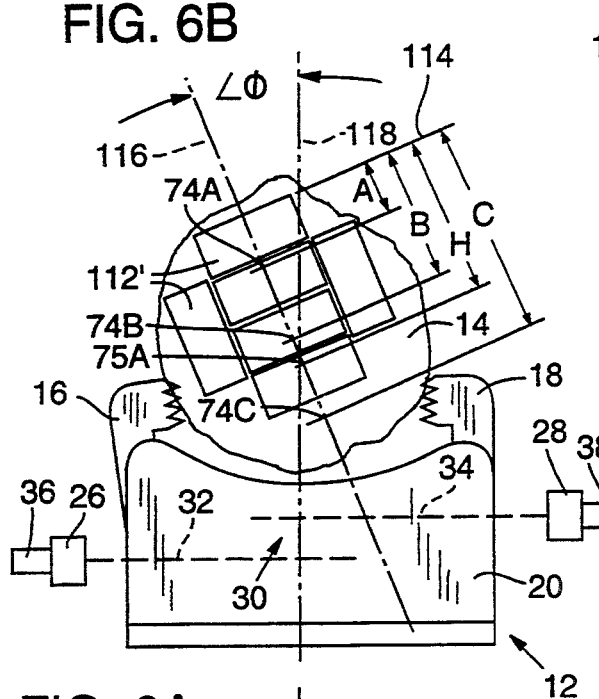
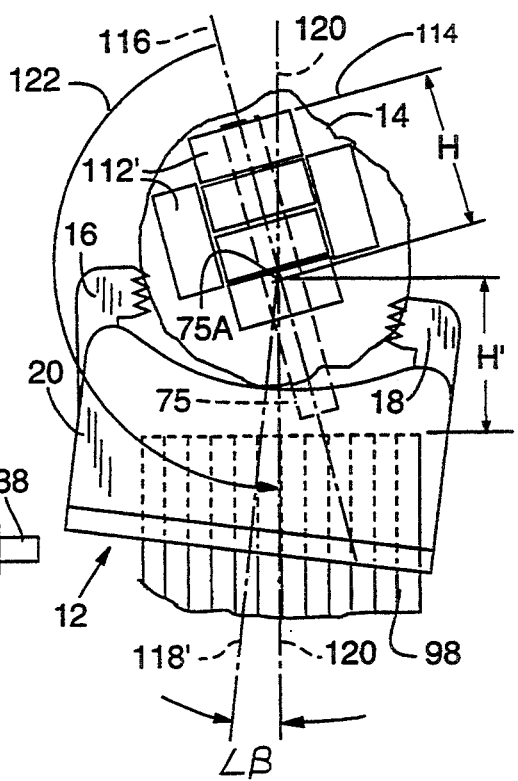
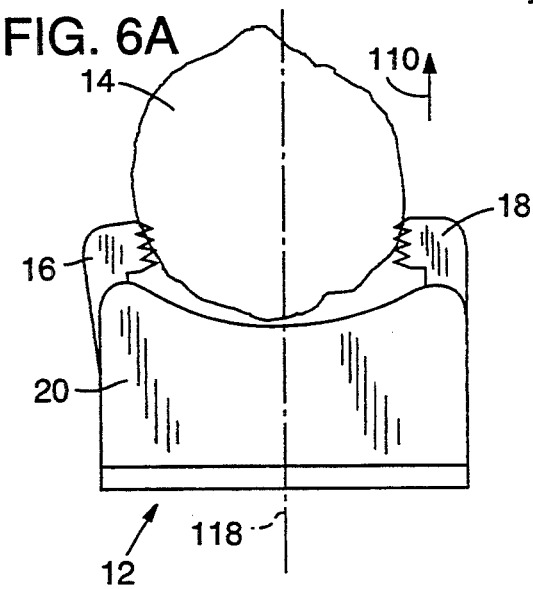
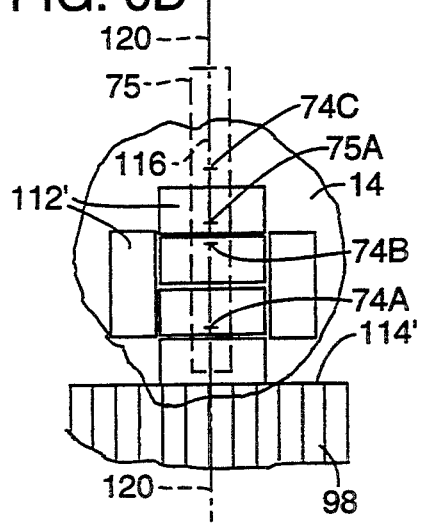

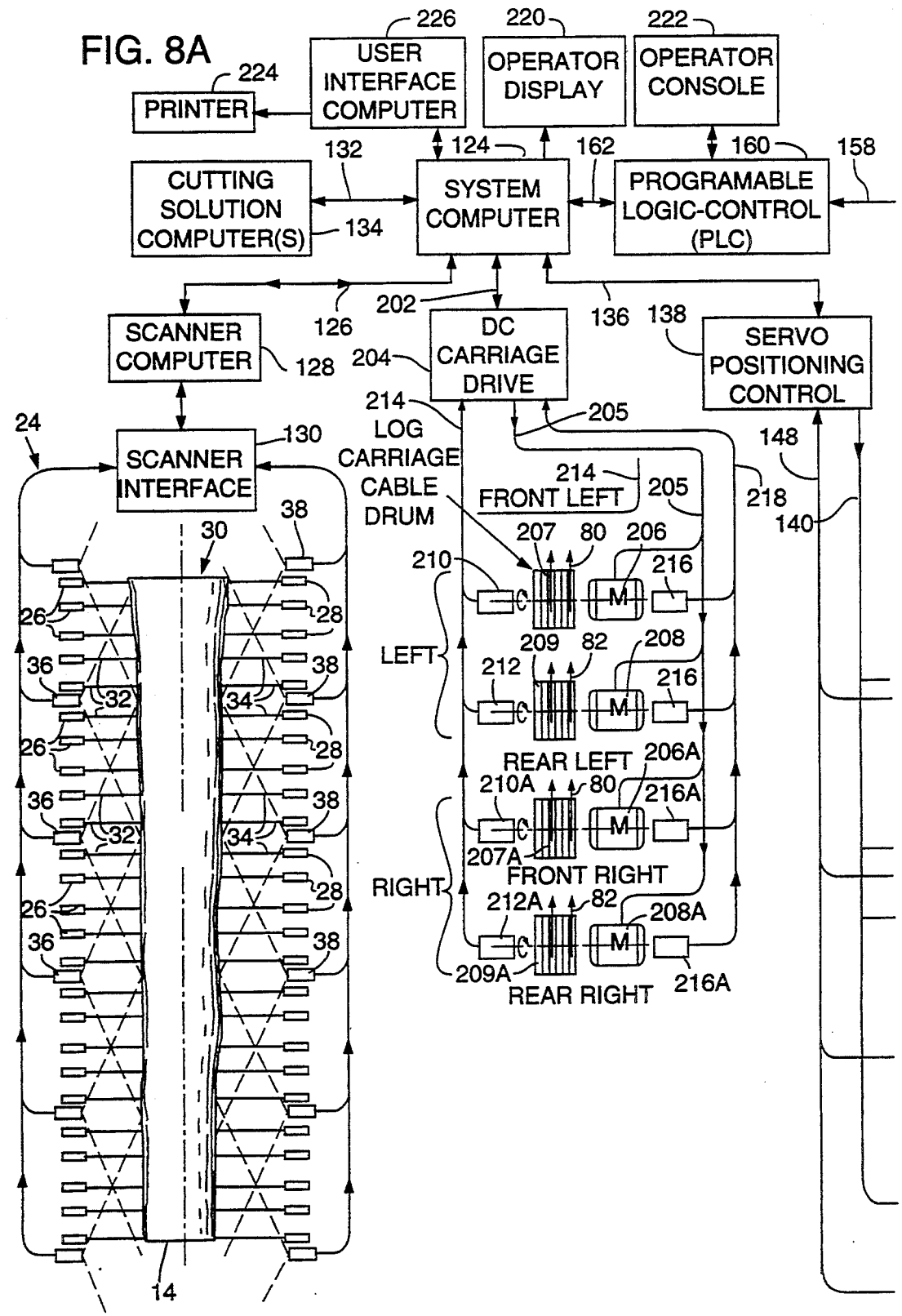

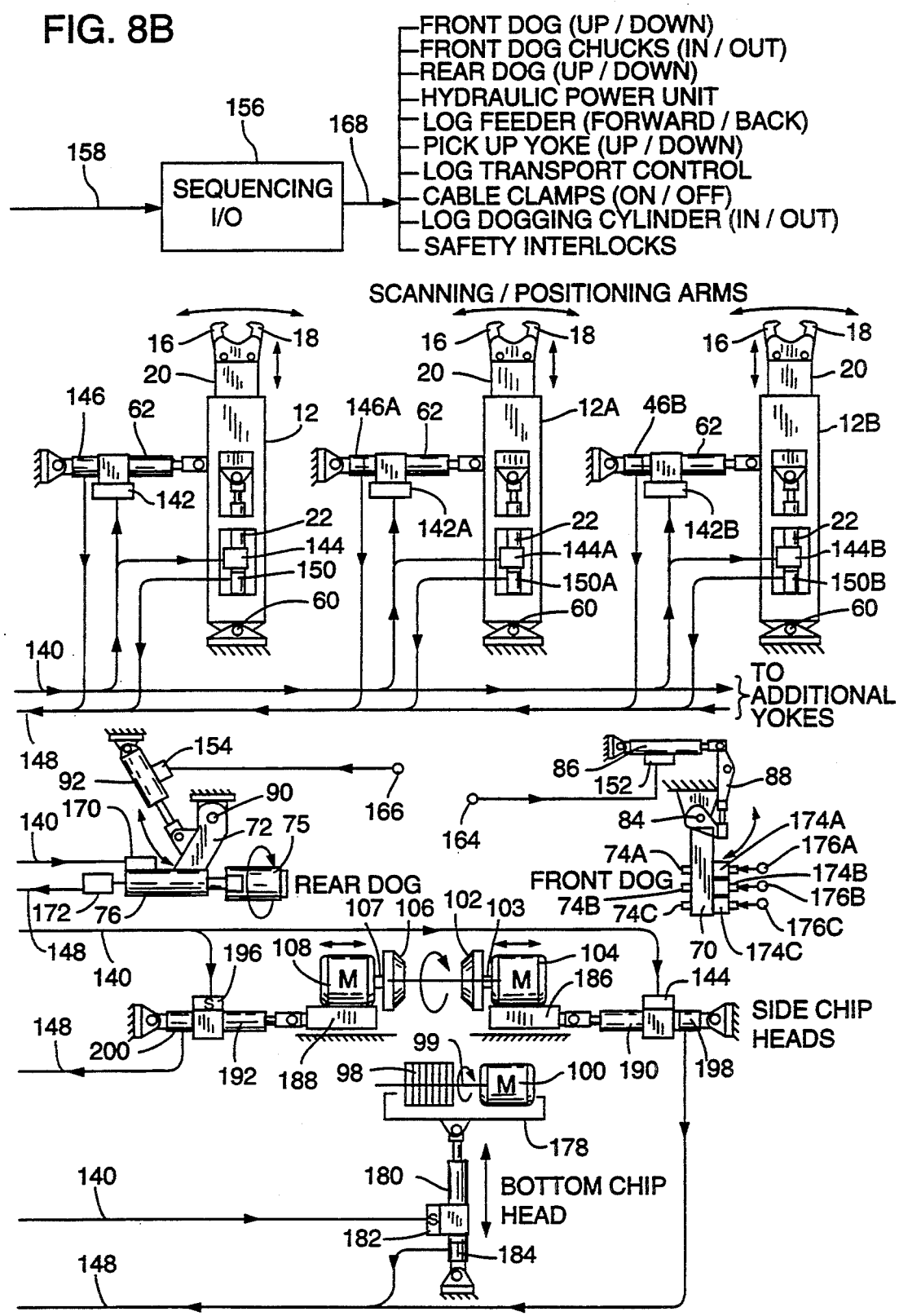

METHOD AND APPARATUS FOR PROCESSING LOG FOR SAWMILL INCLUDING END DOGGING CARRIAGE WHICH ROTATIONALLY REPOSITIONS LOG TO CUTTING POSITION DETERMINED BY COMPUTER AFTER NON-ROTATIONAL SCANNING

BACKGROUND OF THE INVENTION

The present invention relates generally to method and apparatus for processing logs in a sawmill and in particular to such a method and apparatus in which the logs are rotationally repositioned in an end dogging carriage to a desired cutting position after they are scanned in a non-rotational light scanner to determine the configuration of the log and the scan data is fed to a computer to determine the proper cutting pattern for the log. The log is transferred from the scanner to the carriage and then rotationally repositioned by means of a rotationally driven end dog blade engaging one end of the log to rotate it about the axis of a selected chuck which is extended from the end dog at the other end of such log. After the log is rotationally repositioned to the proper cutting position additional end dog chucks are extended into contact with such log to prevent further rotation while the carriage transports the log through the cutting devices, including a bottom chipper head which may be adjusted vertically to provide a curved or straight bottom surface to the log. As a result of such rotational repositioning of the log before cutting, the lumber yield from the log is increased significantly.

It has been previously proposed in U.S. Pat. No. 4,947,909 to Stroud, issued Aug. 14, 1990, to provide a log processing apparatus for a sawmill in which the log is scanned with a non-rotational scanner by transporting the log on a spiked chain conveyor longitudinally through such scanner. The scanner output signal data is fed to a computer which processes such data to determine the configuration of the log and controls the cutting devices, including a top cutting head which is adjusted vertically to provide a top surface which is curved or straight. However, this apparatus has the disadvantage that the log is fixed to the conveyor by the spikes embedded in the bottom of the log so the log cannot be rotationally repositioned to a desired cutting position after it is scanned and transferred to the conveyor, unlike the present invention. Also, the spiked conveyor chain does not hold the log in position as securely as the end dogging carriage and there is no room for a bottom chipping head because of the spikes which may also block the scanner beams. Finally the scanner is slower than the present invention because the log is scanned longitudinally, not laterally.

It has been previously disclosed in U.S. Pat. No. 4,152,960 to Detjen, issued May 8, 1979, to provide a sawmill apparatus having an end dogging carriage for transporting the logs through the sawmills while they are engaged by a pusher dog and a hold-back dog. Prior to engagement by the end dogs, the log is scanned and rotationally oriented to the desired log orientation. However, the log is not rotationally repositioned to the desired cutting position after transfer to the carriage by a rotationally driven end dog blade and a selectable end dog chuck in the manner of the present invention. Thus by transfer of the log to the end dogging carriage after it is repositioned, in the Detjen apparatus the rotational orientation of the log may be accidentally changed during transfer. In addition, there is no mention of laser light scanning or computer processing of the scanning signal in the manner of the present invention.

U.S. Pat. No. 4,867,213 to Bolton et al., issued Sep. 19, 1989, shows a log processing apparatus for a sawmill in which the log is scanned while it is rotated on spindles in a log charger. The scanning spindles at the opposite ends of the log are adjusted in an X-Y direction for angular adjustment or "skewing" of the log axis to the desired cutting position before the log is transferred to the overhead log carriage for conveying the log through the saws and other cutting devices. This has the disadvantage that the rotational orientation and angular skew position of the log may be accidentally changed during transfer so that the log is no longer in the desired cutting position when conveyed by the carriage. Thus, the Bolton apparatus is slower and less accurate and is more complicated and expensive than the method and apparatus of the present invention because in the latter the log is rotationally repositioned to the desired cutting position after transfer to the end dogging carriage. In addition with the present invention the repositioning is by rotating the end dogs under control of the computer in accordance with the desired cutting solution determined from the scanning signal data produced by light scanning of the log in the log charger before transfer to the carriage. Also, the log is more rapidly scanned by moving it laterally with the charger arms through a non-rotational scanner.

U.S. Pat. No. 4,996,900 to Schmidt et al., issued Mar. 5, 1991, shows an end dogging sawmill carriage with independent cable drives for the two end dogs in which the two drive cables are releaseably coupled together by an automatic clamp to temporarily provide a common drive for the two end dogs to move the log through the cutting devices but to otherwise allow them to be driven independently of each other. A similar end dogging carriage is used for the present invention. However, unlike the present invention, this patent does not disclose the use of rotationally driven blade on one end dog or the use of a plurality of selective extendable chucks on the other end dog in order to allow the log to be rotationally repositioned to the proper cutting position after transfer from the scanner to the carriage.

U.S. Pat. No. 4,803,371 of Durland, issued Feb. 7, 1989, discloses an optical scanning method and apparatus for scanning a log to determine its configuration with a plurality of laser light beams spaced along the log and a plurality of polychromatic light sources which are directed to the log and are detected by photo-detector cameras. This prior system is employed to scan elongated objects, including logs and unfinished lumber such as cants, to determine the configuration of such lumber for optimizing the size and number of boards which can be cut from such lumber using a computer which processes the scan data signals produced by the photo-detector cameras.

SUMMARY OF THE INVENTION

It is therefore one object of the present invention to provide an improved method and apparatus for processing logs in a sawmill employing an end dogging carriage having end dogs which rotationally reposition the log to a desired cutting position determined by computer from scan signals produced by light scanning of the log.

Another object of the present invention is to provide such a method and apparatus which is faster and more accurate by employing non-rotational scanning of the log and by rotational repositioning of the log to the desired cutting position after it is transferred to the end dogging carriage.

A further object of the present invention is to provide such an improved method and apparatus for processing a log in a sawmill employing an end dogging carriage having a rotationally driven end dog blade and an end dog chuck for rotatably repositioning the log in the desired cutting position in a simple, accurate, and inexpensive manner.

An additional object of the present invention is to provide such a method and apparatus for processing logs in a sawmill in which an end dogging carriage has a plurality of chucks provided on one end dog which are selectively extended to enable the log to rotate about the axis of the selected chuck and which after rotational repositioning of the log are then actuated for extending more than one chuck into engagement with the log to prevent further rotation of such log.

Still another object of the method and apparatus of the present invention is to provide such a log processing apparatus using an overhead end dogging carriage and a bottom chipper head with an automatic control for vertical adjustment of such chipper head to cut the bottom surface of the log as a curved or straight surface depending upon the log configuration to produce a greater yield of usable lumber from such log.

An additional object of the present invention is to provide such a method and apparatus for processing a log with greater accuracy by rotatably repositioning the log into a desired cutting position after the log has been transferred from the scanner to the log carriage.

A still further object of the present invention is to provide such an improved method and apparatus in which the log is quickly scanned by moving it laterally through a light scanner including a plurality of laser beams spaced longitudinally of the log which are aligned parallel to the central viewing axis of cameras containing photo-detectors for detecting such laser beams and producing scan signals which are processed by a computer to determine the configuration of the log and the desired cutting solution for such log.

BRIEF DESCRIPTION OF THE DRAWINGS

Other objects and advantages of the present invention will be apparent from the following description of a preferred embodiment thereof and from the attached drawings of which:

FIG. 6 shows a method of processing a log in accordance with the present invention including method steps in FIGS. 6A, 6B, 6C and 6D;

FIGS. 8A and 8B show an electrical system for operating the method and apparatus of the present invention in accordance with output control signals of a computer control system which processes scanning signals produced by the light scanner for determining the configuration of such log and for determining the desired solution for cutting the log to increase the lumber yield obtained from the log.

DESCRIPTION OF THE PREFERRED EMBODIMENT

Figure 1:
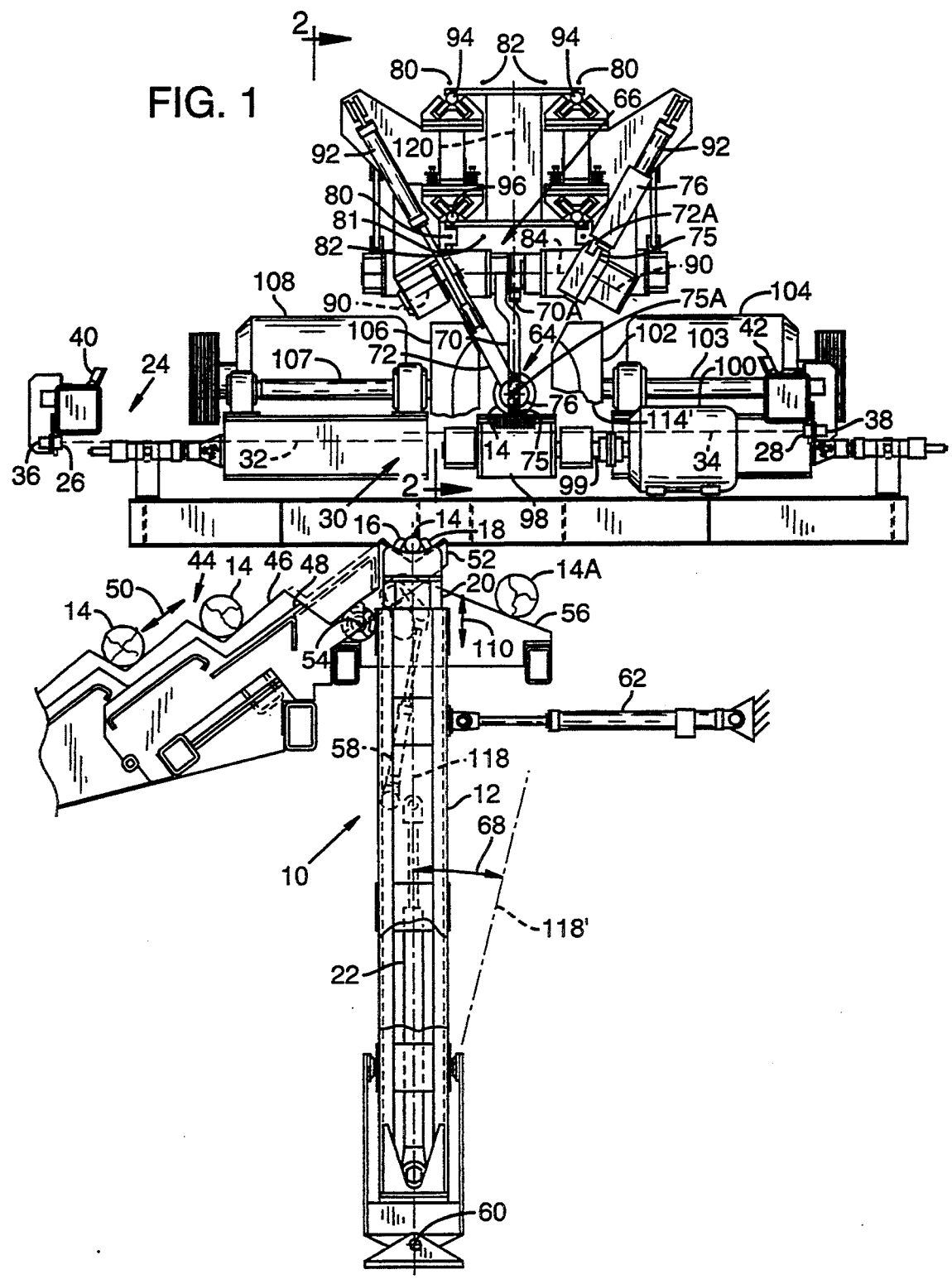
FIG. 1 is a rear elevation view of a log processing apparatus for a sawmill in accordance with the present invention.
Figure 2:
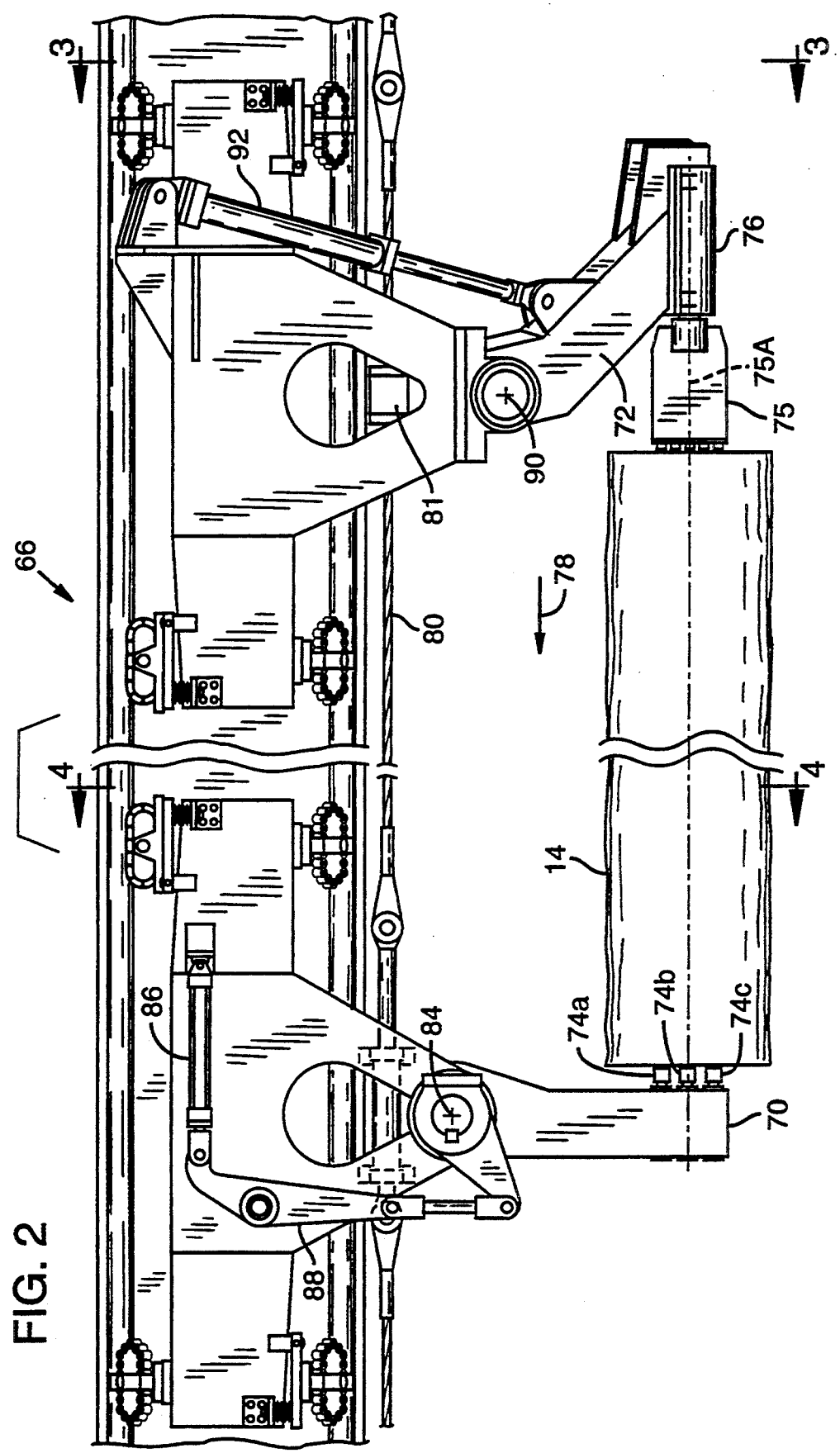
FIG. 2 is a vertical section view taken along the line 2—2 of FIG. 1 showing a portion of the end dogging carriage.

As shown in FIGS. 1 and 2, the log processing apparatus of the present invention includes a log charger device 10 having a plurality of log charger arms 12 including a pair of selected arms positioned adjacent the opposite ends of the log 14 in order to grip the sides of the log between clamping fingers 16, 18. The charger arm 12 is of adjustable length and includes an upper arm portion 20 which is extended outward from the charger arm 12 by a length adjustment cylinder 22 mounted within the lower portion of the charger arm. In this way the charger arms move the log 14 laterally upward through a light scanner 24 in order to scan the log in a manner hereinafter described.

The light scanner 24 may be similar to that shown in U.S. Pat. No. 4,803,371 of Durland and includes two groups of laser light sources 26, 28 spaced apart along the log on opposite sides of a scanning zone 30 as shown in FIG. 8A. Light beams 32, 34 emitted by laser lights 26, 28, respectively, strike the surface of the log 14 when such log is raised laterally upward by the charger arm 12 through the scanning zone 30. The laser light beams 32, 34 are reflected from the surface of the log back to two groups of cameras 36, 38, respectively, also spaced along the log and positioned on opposite sides of the scanning zone 30. The laser light sources 26, 28 which preferably emit infrared light, are spaced apart along the length of the log and cameras 36, 38 are positioned between groups of five light sources, for example, to receive the light beams reflected from such log. The cameras 36, 38 each include a photo-detector which may be a linear diode array of semiconductor diodes such as a charge coupled semiconductor device (CCD) that measures distance from the camera photo-detector to the log by determining the position of the laser beam spot along the linear diode array. Each of the cameras 36, 38 has a lens system to provide a field of view having a central viewing axis. The laser light beams 32, 34 are aligned parallel to each other and to the central viewing axis of the cameras.

Two groups of non-coherent light sources 40, 42 are also provided on opposite sides of the scanning zone 30 in order to illuminate the log with non-coherent light which is transmitted past the log to a camera on the opposite side of the zone from the light source in order to detect the front and rear ends of the log. This may be done by reflection of the non-coherent light from the log to a camera or by blocking the non-coherent light beam with the log to prevent it from reaching the camera. Preferably the light emitted from light sources 40 is reflected from the log and detected by cameras 36 to detect the end of the log in the manner of the Durland patent cited above. Similarly, the light from light source 42 is reflected from the log and received by camera 38 to detect the end of the log. In this way, the opposite ends of the log are detected and the length of the log is determined by the signals produced by the cameras 36, 38. The non-coherent light of light sources 40, 42 may be of a lower intensity than the laser light emitted by laser light sources 26, 28 and is preferably also infrared light so that the same cameras detect both laser light and non-coherent light. During scanning the electrical output signals of the photo-detectors in cameras 36, 38 are transmitted to a computer (not shown) which processes such scanning signals to determine the configuration of the log in three dimensions and to calculate in real time the preferred sawing pattern solution for such log to produce lumber from such log most efficiently to give the highest yield in terms of board feet or dollar value.

The logs 14 are fed to the charger arms 12 by a log conveyor and log separator mechanism 44 which includes a plurality of fixed stair-step members 46 and movable stair-step members 48. The movable step members 48 lift the log from the fixed stair-step on which it is resting and advance it upward and forward to the next fixed stair-step by a reciprocating movement of the movable stair-step in the direction of arrows 50. The logs are separated and deposited into a V-shaped yolk 52 at the top of the log conveyor and separator 44 where they are held until engaged by the clamping fingers 16, 18 of the charger arms 12 and lifted up off of the yolk for scanning. If the log is rejected as being defective the yolk 52 is pivoted clockwise about pivot axis 54 to cause the log to roll off the yolk and down a reject ramp 56 as indicated by rejected log 14A. A yolk actuation cylinder 58 is employed to pivot the yolk 52 counterclockwise about pivot 54 in order to receive the log in the yolk and hold it at the position shown until it is engaged by the charger arm or to pivot the yolk clockwise to allow the log to be discharged from the charger arm down ramp 56 if it is rejected.

The charger arm 12 is caused to pivot about a pivot axis 60 at the bottom end of such log by a swing cylinder 62 which swings the charger arm from the scanning position at the top of the scanning zone 30 to a log carriage position 64 where the log is transferred from the clamp fingers 16, 18 to an end dogging log carriage 66. Thus, each of the pair of charger arms 12 at the opposite ends of the log are adjusted by a different swing cylinder 62 in order to pivot the charger arm and the log about the pivot axis 60 in the direction of arrow 68. It should be noted that the height adjustment cylinder 22 and the swing cylinder 62 are both operated by control signals applied to servo valves for such cylinders by the computer in order to skew the axis of the log or change its angular position to align such log axis with a computer selected carriage axis for transfer to the log carriage 66 at carriage transfer position 64 in the manner hereinafter described. The opposite ends of the log are adjusted in the X and Y directions by swing cylinder 62 and height adjustment cylinders 22, respectively. Thus after scanning the computer control signals cause cylinder 22 to adjust the radial position of the log 14 and cylinder 62 to adjust the angular position of the log in two substantially perpendicular axis for polar coordinate skewing of the log into a position for alignment with the carriage axis charger arms and transfer to the log carriage 66.

Figure 3:
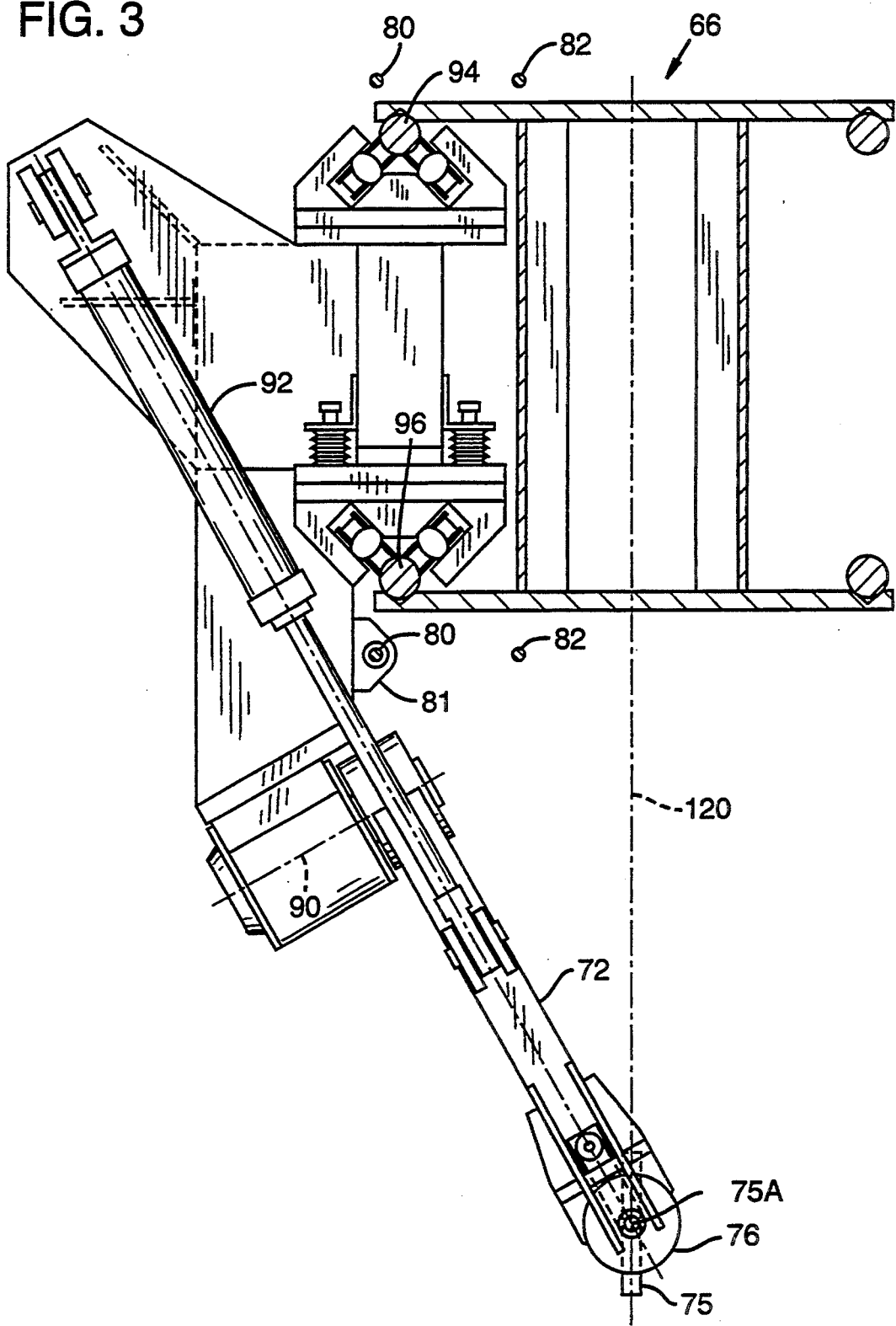
FIG. 3 is a vertical section view taken along the line 3—3 of FIG. 2 showing a mechanism for operating the rear end dog of the carriage having a rotationally driven end dog blade for rotation of the log.
Figure 4:
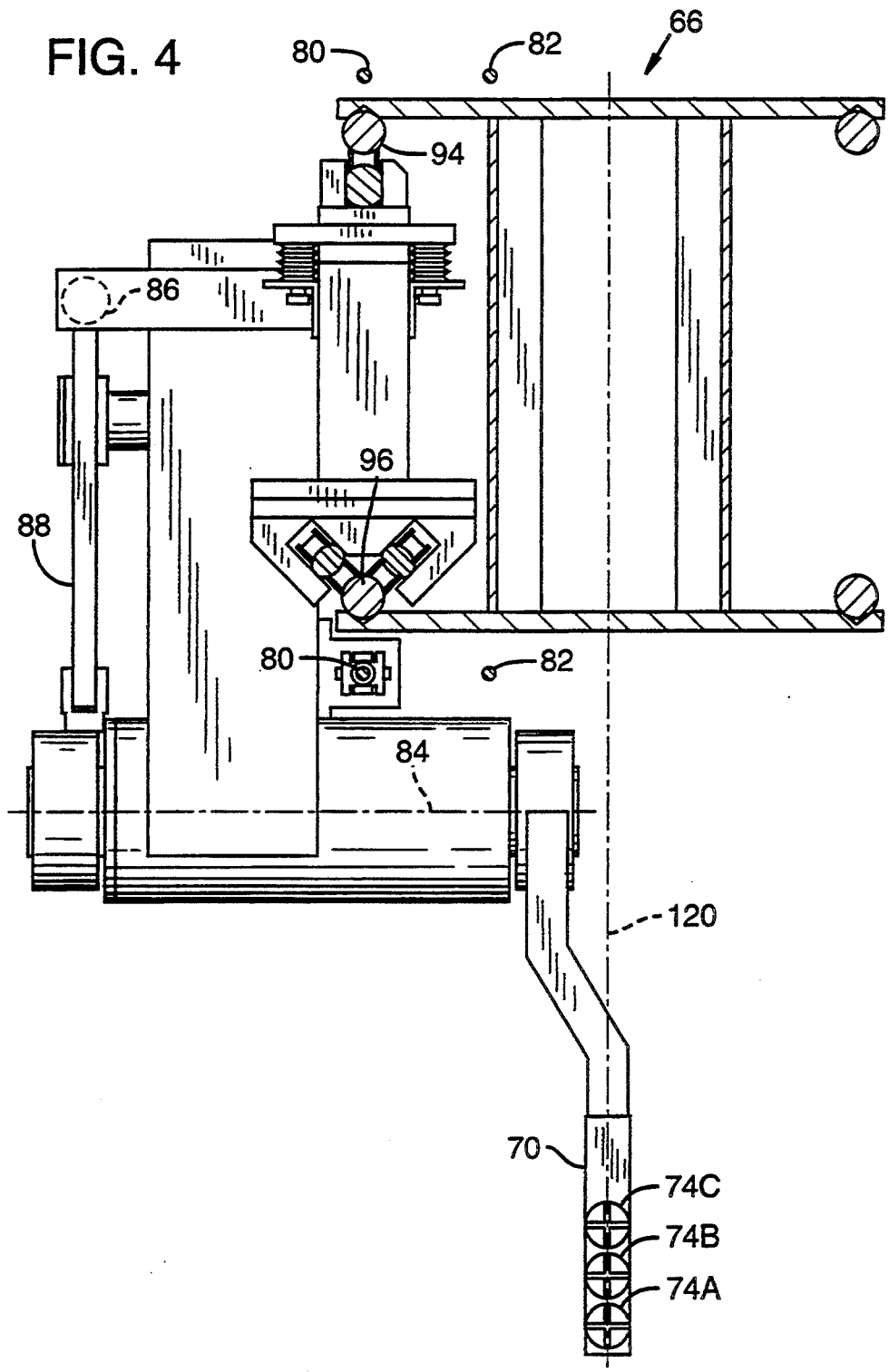
FIG. 4 is a vertical section view taken along the line 4—4 of FIG. 2 showing a mechanism for operating the front end dog having a plurality of selectably extended chucks for controlling the rotation of the log.

As shown in FIGS. 2 and 3, the log carriage 66 is a dual overhead end dogging log carriage having two carriages including a first carriage having a first pair of end dogs 70, 72 which engage the opposite ends of the log to clamp the log between such end dogs for conveying such logs through the cutting devices. The front end dog 70 is provided with three chucks 74A, 74B and 74C which are selectively extended to engage one end of the log 14 at different radial positions. It should be noted that the front end dog chucks 74A, 74B and 74C are selectively extended by hydraulic control means including solenoid valves which are also actuated by computer control signals. The selected chuck provides an axis of rotation on such one end of the log at a position determined by the computer to be the closest of the three chucks to the center of the sawing solution determined by computer for such log. The rear end dog 72 is in the form of a rectangular dog blade member 75 which engages the other end of the log and is driven by a hydraulic rotator 76 to rotationally reposition the log into a cutting position. The log is rotated about an axis extending between the center of the selected chuck and the center of rotation 75A of the dog blade into the desired cutting position where the axis 116 of a sawing solution determined by the computer is aligned with the vertical axis 120 of the log carriage in a manner hereinafter described with respect to the method of FIG. 6. The rotator 76 rotates the dog blade 75 through a repositioning angle less than 360° and preferably ±180° by a servo valve which is controlled by the computer for rotational repositioning of the log into the desired cutting position on the overhead end dogging carriage. After this repositioning, the other non-selected chucks on the first end dog 70 are extended to fix the log in the desired cutting position and to prevent further rotation of such log from such position as the carriage transports the log through the cutting devices in the conveyor direction 78 of FIG. 2 by carriage cables 80, 82.

The end dogging carriage 66 may be of the type shown in U.S. Pat. No. 4,996,909 to Schmidt and McGee. In this end dogging carriage the front end dog 70 and the rear end dog 72 may be independently driven by two separate carriage cables 80, 82 for securing the log between such dogs and may be temporarily connected together by means of a releasable cable clamp 81 which clamps the rear end dog 72 to the drive cable 80 of the front end dog 70 so that the two drive mechanisms of the two cables 80, 82 are added together for conveying the log through the sawmill cutting devices. The second carriage drive cable 82 which normally independently drives the rear log 72 is not shown in FIG. 2 but does appear in FIG. 1.

To enable loading of the log 14 into the log carriage 66 the front end dog 70 may be pivoted about a horizontal pivot axis 84 by means of a dog raising cylinder 86 actuated by a link mechanism 88 to raise the front dog 70 into the raised position 70A so that the log can pass under it as shown by the right front dog of the second carriage in FIG. 1. Similarly, the rear end dog 72 can be raised into raised position 72A by pivoting it about a pivot axis 90 with a raising cylinder 92. These raised positions 70A, 72A of the end dogs enable the log carried by one carriage to pass under the dogs of the second carriage and a log for such one carriage to be moved into the transfer position 64 of FIG. 1 before the end dogs are pivoted downward into engagement with the log as shown in FIG. 2.

As shown in FIG. 1, each of the two end dogging carriages including the first carriage end dogs 70, 72 and the second carriage end dogs 70A, 72A are mounted on rollers to slide along upper guide rails 94 and lower guide rails 96 which guide the movement of the carriages and the log clamped between such end dogs in a predetermined path through the log cutting devices. The cutting devices include a bottom chipper head 98 driven by a shaft 99 connected to an electric motor 100, a right side chipper head 102 connected by shaft 103 to drive motor 104, and a left side chipper head 106 connected by shaft 107 to its drive motor 108. The bottom chipper head 98 may be adjusted vertically during cutting to provide a bottom surface which is curved or straight in a manner shown in FIG. 8B. Thus, the chipper heads 98, 102 and 106 cut the log into a rectangular shaped unfinished lumber member or cant having three flat sides and an unfinished upper side. This cant is then conveyed from the chipper heads to band saws or other saw blades for cutting such cant into boards in accordance with the sawing pattern solution determined by the computer from the scan signal data.

Figure 5B:
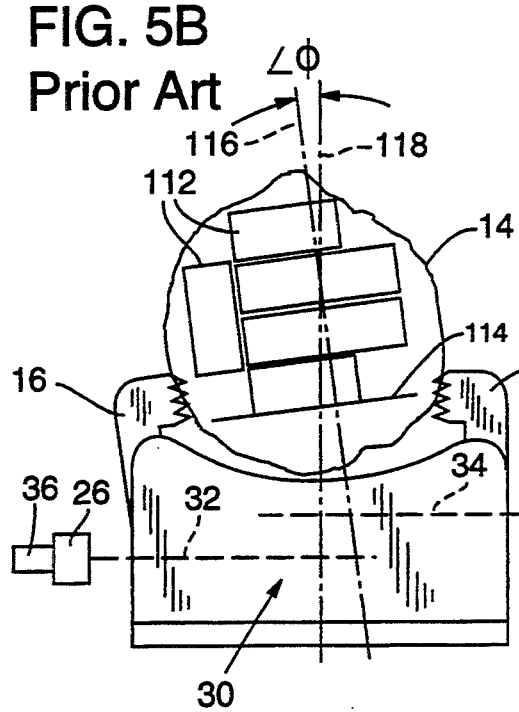
FIG. 5 shows a prior art log processing method including method steps in FIGS. 5A, 5B and 5C.
Figure 5C:
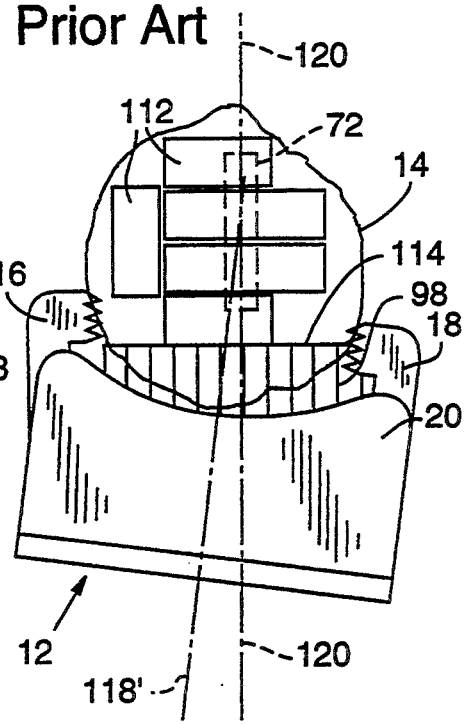
Figure 5A:
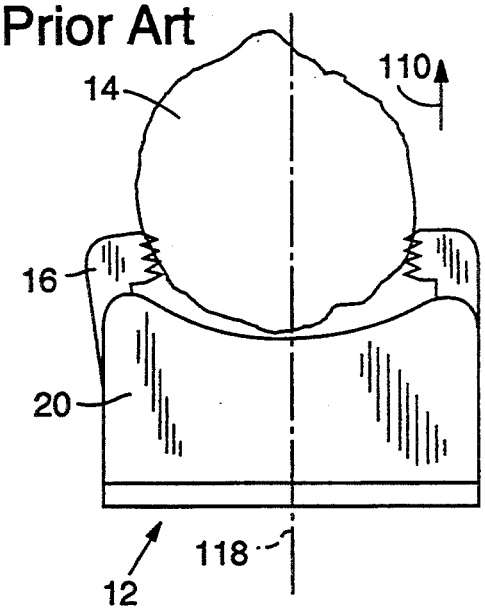

A prior method of log processing is disclosed in FIGS. 5A, 5B and 5C which does not rotationally reposition the log after it is transferred to the end dogging carriage. As shown in FIG. 5A the log 14 is clamped between the clamp fingers 16, 18 of the charger arm and moved upward by extending the upper arm portion 20 of the charger arms 12 along the charger arm centerline 118 in the direction of arrow 110. In FIG. 5B the log has been transmitted through scan zone 30 of the light scanner including laser light beams 32, 34 emitted by light sources 26, 28 to reflect such light beams off the surface of the log to photo-detectors contained in cameras 36, 38, respectively, which are positioned in rows along the opposite sides of the scanning zone 30. The scan signals produced by the photo-detectors of the cameras are processed by computer to determine a sawing solution for the log 14 which is shown in FIG. 5B as a saw pattern 112 of five boards. The log is skewed or angularly adjusted in an X-Y direction by increasing the length of the charger arm 12 and by pivoting the two charger arms secured by fingers 16, 18 at the opposite ends of the log.

It should be noted that a reference line 114 is provided by the computer at the bottom of the saw pattern 112 which after transfer of the log to the log carriage in the step of FIG. 5C is aligned with the top surface of the bottom chipper head 98. In the solution computed step of FIG. 5B, the reference line 114 is perpendicular to a solution centerline 116 which passes through the saw pattern at approximately its mid-point. Also, the solution centerline 116 is at a fixed predetermined angle $\phi$ with respect to the centerline 118 of the log charger which is vertical during scanning and in the solution computed position of FIG. 5B. The angle $\phi$ between the solution centerline 116 and the charger scanning centerline 118 is fixed at approximately 7° in FIG. 5B to compensate for the pivoting movement of the charger arm 12 after it swings to the transfer position of FIG. 5C as shown by its centerline 118', where the log is transferred from the clamping fingers 16, 18 to the end dogs of the end dogging log carriage having a centerline 120. It should be noted that after the log is pivoted to the transfer position of FIG. 5C the reference line 114 at the bottom of the saw pattern 112 is perpendicular to the centerline 120 of the end dogging carriage and is in alignment with the top surface of the bottom chipper head 98. As stated previously, this prior method has disadvantage that there is no rotational repositioning the log into a cutting position after it is transferred to the carriage. As a result, inaccuracies can occur. Also, since there is no rotational repositioning of the log the best saw pattern solution for highest yield of lumber cannot be achieved in many cases using the prior method.

These problems are overcome by the log processing method of the present invention which is shown in FIGS. 6A, 6B, 6C and 6D.

In the first method step of FIG. 6A, the log 14 is clamped between the clamp fingers 16, 18 on the upper end 20 of the two charger arms 12. Then the charger arms are extended upward along axis 118 in a vertical direction to move the log upward in the direction of arrow 110 through the laser light beams 32, 34 in the scan region 30 to scan the log in the step of FIG. 6B. The scan signals produced by the light beams 32, 34 reflected off the surface of the log back to the photo-detectors in cameras 36, 38, respectively, are processed by a computer to determine the desired saw pattern, or cutting solution 112'. The cutting solution 112' of FIG. 6B is different than the cutting solution 112 produced in the prior art method step of FIG. 5B. Thus, the cutting solution 112' of FIG. 6B enables six boards of 2"×4" cross-section to be cut with five of the boards being 16' long and one being 14' long. However, in the cutting solution 112 of FIG. 5B only five boards can be cut from the same log, including three 2"×4" which are 10', 12' and 16' long and two boards 2"×6" which are 16' long. Thus cutting solution 112' of FIG. 6B has a greater yield in board feet of usable lumber. This improvement is possible because of angular repositioning of the log by the end dogs in FIG. 6C hereinafter described.

The cutting solution 112' includes the orientation and position of the solution at both ends of the log relative to the processing system with the use of the solution centerline 116 and the location of the reference surface 114 to be chipped by the bottom chip head 98. The rotational center 75A of the rear dog is on the solution centerline 116 at a distance H above the reference surface 114 corresponding to the top of the bottom chip head in FIG. 6B. At the other end of the log, chuck centers 74A, 74B and 74C are located along the solution centerline 116 at A, B and C dimensions respectively above or away from the reference surface 114. The chuck closest to the mid-point on centerline 116 of the solution 112' will be used as the center of rotation for that end of the log. It should be noted that FIGS. 6A to FIG. 6D are all views of the rear end of the log but the relative positions of the front end dog chucks 74A, 74B and 74C have been shown on such rear end view for clarity even though the chucks are actually on the front end of the log (not shown).

In the next method step of FIG. 6C, the charger arms swing the log into the transfer position where the rotation center 75A of the rear dog is positioned on the system centerline 120. At the transfer position one end of the log is engaged by the end dog rotator blade 75 aligned along the solution centerline 116. The blade axis of rotation 75A is spaced a distance H from the reference line 114 of the saw pattern 112' which is equal to the distance H' from such blade center 75A to the top surface of bottom chipper head 98. One of the chucks 74A, 74B and 74C on the other end dog 72 was selected by the computer to be the center of rotation for that end of the log. The center of the chosen chuck 74A, 74B, or 74C on the other end of the log is positioned the solution centerline 116 and closest to its intersection with the system center line 120 at a distance A, B or C above the reference line 114 corresponding to the top of the bottom chip head 98. The chosen chuck, such as chuck 74B, is extended and then the log is gripped between the rear dog blade 75 and the chosen chuck of the front dog 70. This establishes the axis of rotation between blade center 75A and the center of the selected chuck. With the cutting solution 112' of FIG. 6B the center chuck 74B closest to the center of the saw pattern is selected for extension into engagement with the log. Chuck 74B has its center axis spaced a distance B from the reference line 114 corresponding to the top surface of the bottom cutter head. The other two chucks 74A and 74C are spaced from such reference line 114 by different distances A and C, respectively. Thus distance A is shorter than distance B and distance C is longer than distance B from the reference line. As a result, the log is rotated about an axis of rotation passing through the center of selected chuck 74B and the center of rotation 75A of the dog blade 75 during rotational repositioning of the log.

Figure 7:
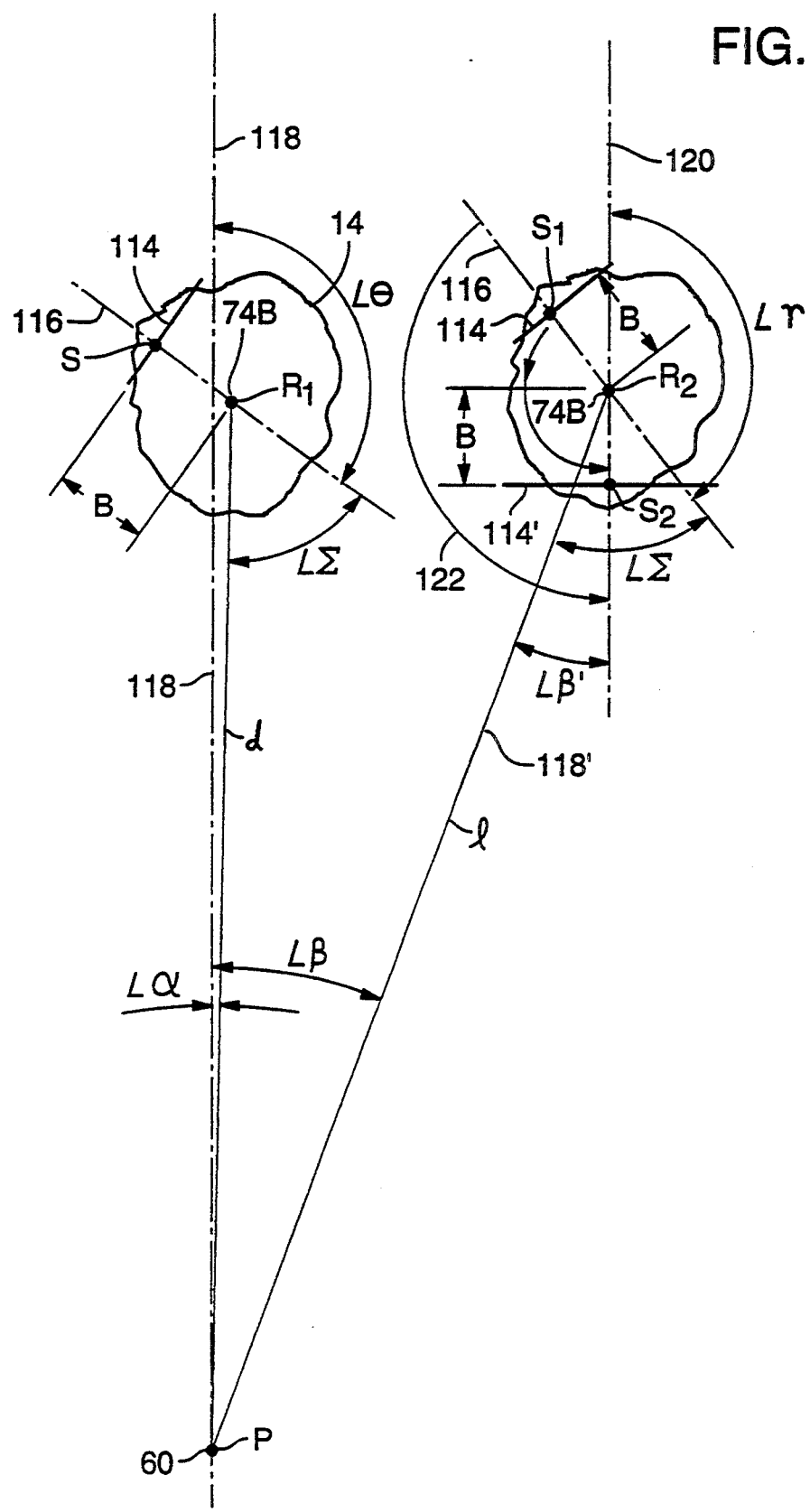
FIG. 7 is a diagram of the geometrical relationships between the log charger arms, the log and carriage end dogs during the method of FIG. 6.

It should be noted that before rotational repositioning the clamp fingers 16, 18 are released after the dog blade 75 and the selected chuck 74B engage the opposite ends of the log in the step of FIG. 6C thereby transferring the log from the charger arms 12, 20 to the end dogging carriage. Rotational repositioning of the log by dog blade 75 which is aligned with centerline 116 in the example of FIG. 6C rotates the log through an angle $\theta$ as shown in FIG. 7. As a result the solution centerline 116 is rotated in a counter clockwise direction through angle 122 into alignment with the end dogging carriage centerline 120. In the example shown in FIG. 6C the angle $\theta$ and angle 122 are approximately 165°.

In the method step of FIG. 6D the log has been rotated by the dog blade 75 in a counterclockwise direction through angle 122 into a cutting position. In this cutting position the reference line 114 of the saw pattern solution 112' is in horizontal alignment with the top surface of the bottom chipper head 98 and the solution axis 116 is in vertical alignment with the centerline 120 of the lathe carriage as indicated by the vertical position of the end dog blade 75. As stated previously, this is possible because the center of rotation 75A of the end dog blade 75 is spaced a distance H from the reference line 114 which is equal to the distance H' from such center of rotation to the top surface of the bottom chipper head 98 as shown in FIG. 6C. After rotational repositioning of the log the other chucks 74A and 74C are also extended into engagement with the end of the log to help prevent further rotation of the log and to fix it in the cutting position of FIG. 6D.

After the step of extending all of the chucks 74A, 74B and 74C into engagement with the log it is transported by the carriage through the chipper heads 114, 102 and 106 shown in FIG. 1 and also through saws for cutting the log in accordance with the cutting solution into the boards.

As shown in FIG. 7, the log processing method of the present invention involves defining by the computer a cutting solution with an intersection point S of the solution centerline 116 and the reference line 114 provided at the bottom of the cutting solution. The reference line 114 corresponds to the top surface of the bottom chipper head. The angle $\theta$ is also determined between the solution centerline 116 and the vertical log charger arm axis 118 when the charger arm holds the log 14 in the vertical scan position. The position of the selected chuck 74B of the front end dog 70 is shown as point $R_1$ on the solution centerline 116 and is spaced a known distance B from the reference line 114. The angle $\alpha$ between the charger arm centerline 18 in the vertical scan position and the radial position, d, of the rotate center $R_1$ of the selected chuck 74B passing through the charger arm pivot point 60 is also calculated from the position coordinates of point $R_1$ and pivot point P. The length l of the charger arm and the angle $\beta$ between the vertical charger arm axis 118 and the pivoted charger arm axis 118 are fixed and known for each spacing distance A, B or C of the optional chucks 74A to 74C above the bottom chip head reference line 114. The amount of charger arm length adjustment required for repositioning is (l-d) cos $\alpha$. The amount of angular adjustment of the charger arm is ($<\beta - <\alpha$). These adjustments place $R_1$ at $R_2$. The adjustment of the other end of the log is similar except it will use H for the spacing distance of the rear dog axis 75A above the reference line 114, rather than A, B or C of the optional chucks.

After transfer of the log to the carriage the rotational repositioning of the log is accomplished by the end dogs which rotate the log through the angle $\gamma$, which corresponds to the angle 122 in FIG. 6C of counterclockwise rotation of the solution centerline 116 into alignment with the conveyor centerline 120. As a result, the reference line 114 of the cutting solution is aligned with the top surface 114' of the bottom chipper head.

The rotational reposition angle $\gamma$ of FIG. 7 is determined by the following formula $\gamma = \theta + \beta - \alpha$. This formula is derived as follows:

| | | |
|---|---|---|
| Equation 1 | | |
| $\pi = \gamma + \Sigma - \beta$, | | $\angle\beta' = \angle\beta$ since lines 118 and 120 are parallel), |
| Equation 2 | | |
| $\pi - \Sigma = \gamma - \beta$ | | (Equation 1 transposed), |
| Equation 3 | | |
| $\pi = \theta + \Sigma - \alpha$, | | |
| Equation 4 | | |
| $\pi - \Sigma = \theta - \alpha$ | | (Equation 3 transposed), |
| Equation 5 | | |
| $\gamma - \beta = \theta\, \alpha$ | | (obtained by substituting Equation 2 into Equation 4), |
| Equation 6 | | |
| $\gamma = \theta + \beta - \alpha$ | | (Equation 5 transposed). |

The above calculations are made by the computer during processing of the scanning signals and other input signals corresponding to the position of the charger arms and the end dogs which is produced by transducers in a conventional manner as hereinafter described with respect to the circuit of FIG. 8.

A computer control system for the log processing apparatus and method of the present invention is shown in FIG. 8. The system includes a main system computer 124 having a first connection 126 connected to the output of a scanner computer 128 for receiving scan data signals therefrom. The scanning output signals of the photo-detectors in cameras 36, 38 of the log scanner are transmitted through a scanner interface 130 to scanner computer 128 which converts the scanning output signals of the cameras to digital scan data signals. A second connection 132 of the system computer 124 is connected to a cutting solution computer 134 which processes the scan data signal transmitted from the system computer to determine the log configuration and to produce the log cutting solution in real time for the log being scanned. The desired cutting solution signal is then transmitted from the solution computer 134 to the main system computer 124 which produces output control signals at a third computer connection 136 connected to a servo positioning control 138. The servo positioning control 138 produces a plurality of parallel output control signals at outputs 140 which are transmitted to the servo control valves, including first servo valves 142, 142A and 142B for controlling the swing cylinders 62 which rotate the charger arms 12, 12A and 12B about their pivot point 60 for X positioning to skew the axis of a log while it is clamped by the clamping fingers 16, 18 of the charger arm.

The control signal applied to the servo valves 142 also swings the charger arms about pivot 60 from the scanning position to the transfer position for transfer of the log from the charger arms to the log carriage.

In addition, another output control signal from the outputs 140 of the servo positioning control is transmitted to a second servo valve 144, 144A and 144B for causing the charger arms 12, 12A and 12B to change in length such as during scanning when the log is raised laterally through the scanning zone 30 of the light scanner, including laser light sources 24, 26 and photodetector cameras 36, 38.

In addition, the second servo valve 144 also adjusts the length of the charger arm for Y dimension skewing of the log axis after the desired cutting solution signal is determined by the cutting solution computer 134. Here again, different Y skewing signals may be applied to each of the second solenoid valves 144, 144A, 144B for adjusting the charger arms 12, 12A, 12B, to different lengths depending upon which pair is being operated to hold the other end of a log. It should be noted that only two charger arms are employed at a time to grip the log adjacent its opposite ends, and whether the second arm 12A or the third arm 12B is operated depends upon the length of the log while the first charger arm 12 is operated for all logs.

Electrical position transducers are employed with the feedback control logic to control the servo valves including a first transducer 146 connected to the swing cylinder 62 to sense the position of the piston of such cylinder and provide an electrical output position signal which is applied to one of a plurality of parallel inputs 148 of the servo positioning control 138. A second transducer 150 is mounted on the charger arm height adjustment cylinder 22 to sense the position of the piston in such cylinder to provide an output position signal which is transmitted to another of the parallel inputs 148 of the servo positioning control in order to control the second servo valve 144 to stop the cylinder when the charger arm reaches the correct height.

The end dogs 70, 72 are raised into an up position and lowered into a down position by solenoid valves 152, 154, respectively, which control the operation of the cylinders 86, 92 in accordance with dog up and dog down signals produced by a sequencing circuit 156 connected by an input terminal 158 to the output of a programmable logic control 160. The programmable logic control 160 is connected to a fourth connection 162 of the main system computer 124 which determines when the sequencing circuit 156 opens and closes control valves including valves 152 and 154 which are connected at input terminals 164, 166, respectively, connected to one of the parallel outputs 168 of sequencer 156.

A third servo valve 170 is connected to the rotary actuator 76 of the rear end dog 72 for rotating the end dog blade 75 in response to a control signal on another of the outputs 140 of control 138, to rotationally reposition the log for alignment of the reference line 114 of the desired cutting pattern with the top surface of the bottom chipping head as previously described in the method steps of FIG. 6. A resolver control element 172 is connected to the shaft of the rotary actuator 76 to provide a position feedback signal to one of the inputs 148 of the control 138 indicating the rotational position of such shaft to control the operation of the third servo valve 170 which causes the rotator 76 to rotate the dog blade 75 through the proper angle.

The three chucks 74A, 74B and 74C on the front end dog 70 are selectively operated by third valves 174A, 174B and 174C, respectively, whose inputs 176A, 176B, and 176C, respectively, are controlled to different ones of the parallel outputs 168 of the sequencer 156. As a result, the computer 124 operating through the sequencer 156 controls which of the three chucks is extended by its control valve into engagement with the log to provide the selected chuck axis about which the log is rotated by the rear end dog blade 75.

The bottom chipper head 98 and its drive motor 100 and drive shaft 99 are mounted on a carriage 178 which is moved up and down by an elevation cylinder 180 in response to a control signal applied by an output 140 of controller 138 to a fourth servo valve 182 connected to such cylinder. As a result, the cylinder 180 raises and lowers the bottom chipper head 98 to change its vertical height during cutting so that such chipper head cuts the bottom surface of the log as a curved or straight surface depending upon the shape of the log. A third transducer 184 is provided on the elevation cylinder 180 to sense the position of the piston in such cylinder and produce an output signal which is transmitted to one of the parallel input terminals 148 of the servo positioning control 138 in order to control the servo valve 182 to insure that the carriage 178 is adjusted to the proper height.

In a similar manner, the side chipper heads 102, 106 and their associated motors 104, 108 are each mounted on two different carriage 186, 188, respectively, which are adjusted horizontally to move the side chipper heads toward and away from the log by control cylinders 190, 192, respectively. The control cylinders 190, 192 are provided with servo valves 194, 196, respectively, which are controlled by different ones of the parallel outputs 140 of the servo positioning control 138. In addition, the control cylinders 190, 192 are provided with transducers 198, 200, respectively, whose outputs are also connected to different ones of the parallel inputs 142 of the servo positioning control 138 in order to control the servo valves 194, 196 to properly position the side chipper head carriages 186, 188 at the desired horizontal spacing depending upon the width of the log.

The main system computer 124 is provided with a fifth terminal 202 connected to a DC carriage drive 204 for the log carriage which provides control signals on parallel outputs 205 for controlling the operation of a first cable drive motor 206 and a second cable drive motor 208 which drive the cable drums 207 and 209, respectively, about which the first carriage cable 80 and the second carriage cable 82, respectively, are wound. A first resolver 210 is connected to the shafts of the first cable drum 207 and a second resolver 212 is connected to the shaft of the second cable drum 209 for sensing the rotational position of such cable drums and providing a position signal to one of several parallel inputs 214 of the carriage drive circuit 204. In addition, a TAC control 216 is provided for each of the cable drive motors 206, 208 to sense the speed indicator of such drive motors and provide a speed signal at one of the parallel inputs 218 of the carriage drive.

The computer control system may include an operator display 220 to monitor the operation of the main system computer 124. Also an operator console 222 may be provided for changing the control settings of the programmable logic control circuit 160. Finally, a computer printer 224 may be connected through a user interface computer 226 to the main system computer for printing out computer data and other output information.

It will be obvious to those having ordinary skill in the art that many changes may be made in the above-described preferred embodiment of the present invention. Therefore the scope of the present invention should be determined by the following claims.

We claim:

1. A log processing apparatus for a sawmill, comprising:
    a carriage system for conveying a log through log cutting devices;
    a first end dog device connected to said carriage system for engaging one end of the log;
    a second end dog device connected to said carriage system for the other end of the log to clamp the log between said dog devices;
    a scanner system for scanning the log to determine its configuration;
    a computer system to determine optimum cutting solution for cutting said log into boards, before the log is engaged by the end dog devices of said carriage system; and
    rotational drive means for rotating at least one of said first and second end dog devices into different angular positions to reposition the log after it is clamped between said dog devices into a cutting position before it is conveyed through the cutting devices.

2. A log processing apparatus for a sawmill, comprising:
    a carriage system for conveying a log through log cutting devices;
    a first end dog device connected to said carriage system for engaging one end of the log;
    a second end dog device connected to said carriage system for the other end of the log to clamp the log between said dog devices;
    rotational drive means for rotating at least one of said first and second end dog devices into different angular positions to reposition the log after it is clamped between said dog devices into a cutting position before it is conveyed through the cutting devices; and
    where only the first end dog is connected to the rotational drive means, and the second end dog is provided with a plurality of laterally spaced idler chucks which are selectively moved into engagement with the other end of the log to cause the log to rotate about one selected chuck during the repositioning of the log into its cutting position and to prevent further rotation of the log from said cutting position by engagement of the log with at least two chucks.

3. Apparatus in accordance with claim 1 in which one of the log cutting devices is a bottom chipping head which cuts the bottom surface of the log after it is repositioned and conveyed through the cutting device.

4. Apparatus in accordance with claim 3 in which the bottom chipping head may be adjusted up and down during cutting to provide a curved or straight bottom surface on the log.

5. Apparatus in accordance with claim 1 which also includes a log charger device for clamping the log with at least two charger arms and moving the clamped log through the scanner system during scanning.

6. Apparatus in accordance with claim 5 in which the charger arms are extended and retracted to adjust the position of the ends of the log along one axis and are pivoted to adjust the position of said log ends along another axis during scanning and to move the log from the scanner system to the carriage system.

7. Apparatus in accordance with claim 5 in which the charger arms move the log through the scanner system for scanning the log without rotation of said log.

8. Apparatus in accordance with claim 2 in which the first end dog rotates the log into a cutting position for cutting the log in accordance with an cutting solution determined by a computer from scanning signal data produced by a light scanner system which scans the log with a plurality of light beams spaced along the length of the log to determine the configuration of the log, and the one selected chuck which engages the log during rotation for repositioning is selected by said computer in accordance with the cutting solution.

9. A method of processing logs for a sawmill, comprising the steps of:
    scanning the log with a scanner to produce scan data for determining the configuration of said log;
    processing the scan data with a computer to determine a cutting solution for cutting that log into boards;
    transferring the log from the scanner to a log carriage for conveying the log through log cutting devices;
    rotating the log while its opposite ends are engaged by first and second end dogs of said carriage to reposition the log into a cutting position for cutting the log in said optimum cutting solution; and
    conveying the log in said cutting position through said cutting devices.

10. A method in accordance with claim 9 in which the first end dog is moved into engagement with one end of the log and is driven by a rotational drive to rotate the log about one selected idler chuck, said chuck being selected from a plurality of idler chucks on the second end dog by the computer to engage the other end of the log and thereby provide the axis of rotation of said log.

11. A method in accordance with claim 9 in which the log is scanned by moving the log laterally with a log charger through a plurality of light beams spaced along the length of the log without rotating the log during scanning.

12. A method in accordance with claim 11 in which the two ends of the log are adjusted in position by two charger arms of the log charger before the log is transferred to the log carriage.

13. A method in accordance with claim 12 in which the charger arms are pivoted and are extended and retracted to adjust the position of the two ends of the log and are pivoted to transfer the log to the carriage.

14. A method in accordance with claim 9 in which the bottom surface of the log is cut with a chipping head to provide a reference surface for cutting the optimum cutting solution.

15. A method in accordance with claim 14 in which the height of the chipping head may be adjusted up and down during cutting as the log is conveyed past said chipping head to cut a curved or straight bottom surface on the log.

16. An end dog apparatus for a log carriage, comprising:
- a first end dog device including a rotatable dog member;
- a drive mechanism for rotating the rotatable dog member to rotate a log engaged at one end by said dog member into different angular positions; and
- a second end dog device including at least one chuck member for engaging the other end of the log to enable said log to rotate about the axis of said one chuck member.

17. An apparatus in accordance with claim 16 in which the second end dog device has a plurality of laterally spaced chuck members and an actuator mechanism for selectively actuating the chuck members to move a selected one chuck member into engagement with the end of the log for rotation of the log and to move at least one additional chuck into engagement with the end of said log to prevent further rotation of the log after it is in a cutting position.

18. An apparatus in accordance with claim 16 which includes a pivotal mount for mounting the first dog device to pivot from a retracted position remote from the log to an extending position where it engages the end of the log, and the drive mechanism rotates the rotatable dog member into a predetermined angular position set by a computer.

19. Apparatus in accordance with claim 17 in which the actuator mechanism is fluid operated and has an automatic control for selectively actuating the chuck members.

* * * * *